(12) United States Patent
Anderson et al.

(10) Patent No.: US 10,457,360 B1
(45) Date of Patent: Oct. 29, 2019

(54) METHOD OF REMOVING AQUATIC WEEDS FROM WATERCRAFT TRAILERS

(71) Applicants: Michaela Anderson, Hutchinson, MN (US); Justin Kofoed, Hutchinson, MN (US)

(72) Inventors: Michaela Anderson, Hutchinson, MN (US); Justin Kofoed, Hutchinson, MN (US)

( * ) Notice: Subject to any disclaimer, the term of this patent is extended or adjusted under 35 U.S.C. 154(b) by 0 days.

(21) Appl. No.: 16/016,506

(22) Filed: Jun. 22, 2018

(51) Int. Cl.
*B63B 59/06* (2006.01)
(52) U.S. Cl.
CPC .................... *B63B 59/06* (2013.01)
(58) Field of Classification Search
CPC ........................................ B63B 59/06
See application file for complete search history.

(56) References Cited

U.S. PATENT DOCUMENTS

| | | | |
|---|---|---|---|
| 5,111,762 A * | 5/1992 | Frangiamore | B63B 59/06 114/222 |
| 5,209,176 A * | 5/1993 | Pompei | B63B 59/08 114/222 |
| 7,775,221 B2 * | 8/2010 | Zeile | B08B 17/00 134/123 |
| 9,527,559 B2 * | 12/2016 | Ford | B63B 59/06 |
| 2007/0277336 A1 * | 12/2007 | Heaslet | A63C 11/08 15/105 |

* cited by examiner

*Primary Examiner* — Stephen P Avila

(57) ABSTRACT

A method that uses a tool specifically designed for removing weeds, milfoil, invasive species, or any other foreign matter from boat, pontoon, personal water craft trailers, dock, boat lift and the like. The tool incorporated within this method of removing weeds and the like from watercraft trailers is able to cut weeds in half or scrape weeds that are hanging on trailer beams allowing them to fall to the ground. It can hook or grab weeds pulling them off trailer beams. The tool can slide on trailer beams capturing weeds in the tool head, which can then be removed when the tool head is taken off the trailer beam. A rotating handle is incorporated allowing ease of use from many different angles.

1 Claim, 4 Drawing Sheets

# METHOD OF REMOVING AQUATIC WEEDS FROM WATERCRAFT TRAILERS

FIELD OF THE INVENTION

This invention relates to a method incorporating a tool suitable and designed for removing weeds, milfoil, invasive species, or any other undesirable material from a boat, pontoon, personal watercraft trailer, dock, boat lift and the like.

BACKGROUND OF THE INVENTION

Aquatic invasive species are becoming an increasing problem for Unites States Fish and Wildlife services and state Natural Resource Departments to control. Aquatic invasive species are aquatic organisms that invade ecosystems to the point where natural habitat is damaged beyond recovery. These aquatic organisms are not native to the lakes, rivers, and streams they reside in and can spread from one body of water to another by boat, pontoon, or personal watercraft trailers.

According to each states Natural Resource webpage, 20 of the lower 48 states have laws related to the removal of aquatic invasive species from boat, pontoon, personal watercrafts and their trailers. Many private lake associations have boat and trailer checks both in and out of landings in efforts to ensure that invasive species are not being transported into their lake.

Currently there are no methods that incorporate tools on the market designed for removing weeds, milfoil, invasive species or any other undesirable aquatic vegetation from a boat, pontoon, or personal watercraft trailer and the like. Boat, pontoon, and personal watercraft users may resort to using oars, nets, fishing rods, or other available things to remove weeds and invasive species from their trailers, but these are not designed for this function and the user eventually has to remove the remaining weeds from the trailer by hand. Often times this requires the user to crawl on the ground underneath the trailer to remove all weeds. The distance between the ground and trailer is roughly 18 inches making it difficult to crawl underneath. At boat landings the ground is often gravel or dirty pavement and wet from the water dripping off the trailer and/or watercraft. These factors make crawling on the ground underneath the trailer to remove weeds undesirable; therefore, this step is often skipped by users.

This invention creates a method incorporating a tool that is designed to make the removal of weeds, milfoil, invasive species, or any other undesirable material from boat, pontoon, personal watercraft trailers, and the like significantly easier for the user. Inventing an easier method for users to remove these aquatic hitchhikers will aid in the effort to slow the spread of aquatic invasive species and help maintain our natural resources for years to come. This will also help users be compliant with the laws currently established for cleaning aquatic invasive species off watercrafts, trailers, and the like.

BRIEF DESCRIPTION OF THE DRAWINGS

FIG. 1 is a 2-D picture of what a standard boat on a trailer with weeds looks like.

DETAILED DESCRIPTION OF THE EMBODIMENTS

Figure 1:
Figure 2:
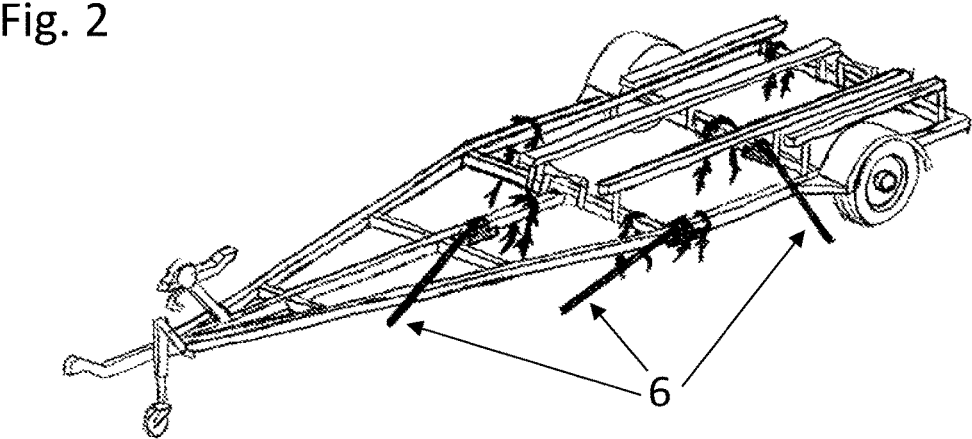
FIG. 2 is a high-level pictorial of how this method incorporating a tool is used to remove aquatic invasive species from boat trailer beams.

The invention is a method that uses a tool to remove weeds, milfoil, invasive species, or any other undesirable aquatic material from boat, pontoon, personal watercraft trailers or the like. FIG. 1 is showing a visual representation of a boat on a trailer with weeds. Weeds accumulate on the trailer beams and between the boat and trailer bunks. The trailer ground clearance is 18 inches and access under the trailer is difficult. The method of this invention incorporates a tool to reach the trailer beams underneath the watercraft from many different angles when standing on the outside of the trailer. The method using a tool is also designed to perform the same task on the side beams located on the outside of trailer. FIG. 2 is showing just the boat trailer with weeds on the trailer beams and the method of removing weeds with a tool (6) in multiple different positions on the trailer. Note, normally the boat or like would be on the trailer, but it was removed in FIG. 2 for better visual of the method of removing weeds or the like. With this method the user can slide the tool (6) across the inside and outside trailer beams when standing on the outside perimeter of the trailer to remove weeds.

Figure 3:
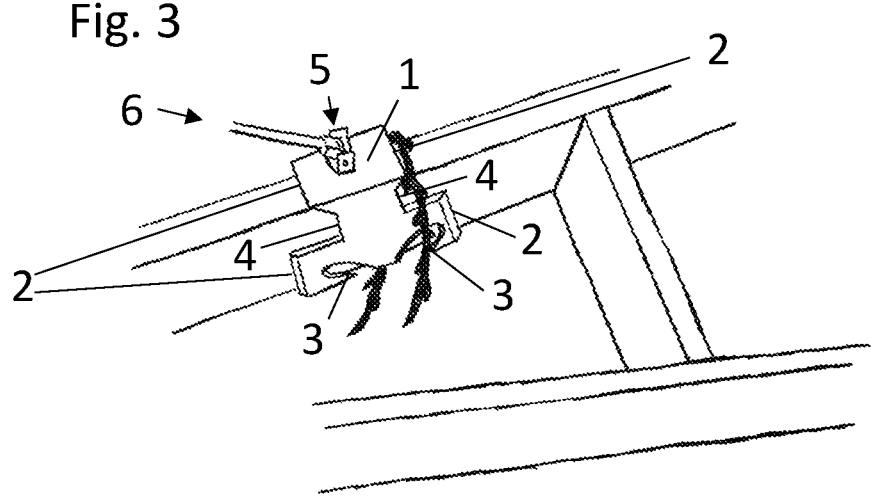
FIG. 3 is a close-up view of a potential tool for this method focusing on the conformity to trailer beams and its ability to accumulate weeds when pushing and pulling across trailer beams.

FIG. 3 is a close-up view showing how the method incorporates a tool (6) shape that is specifically designed to follow the trailer beam allowing it to slide easily when pushed or pulled. Different geometries could be used, but the top face (1) of the tool (6) is preferred to be of similar width as the trailer beam allowing the tool (6) to balance easily on the trailer beam when in use. FIG. 3 is also showing how the method, which incorporates a tool (6) is ideally designed to allow weed accumulation over the leading side edge (4) and under the leading top edge (4) of the head so upon removal of the tool (6) from the trailer the accumulated weeds come with the tool head (6).

Figure 4:
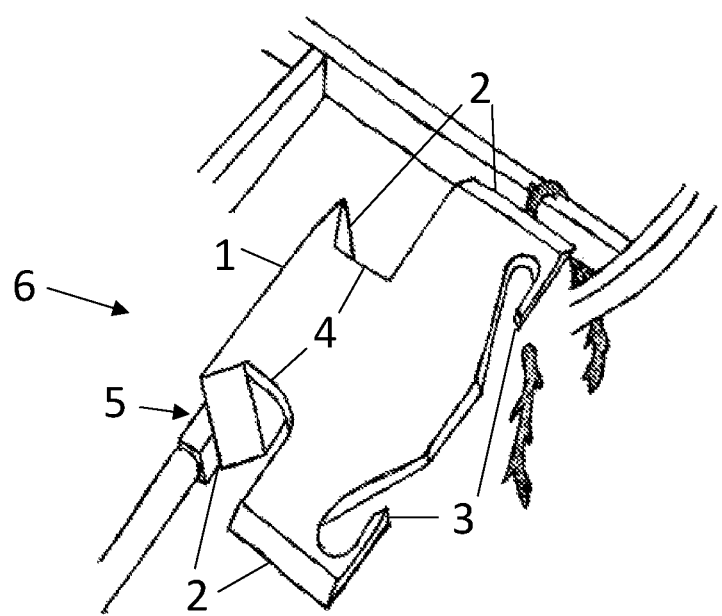
FIG. 4 is a close-up view of a potential tool for this method cutting a weed in half using the designed cutting edge to remove it from the trailer beam.
Figure 5:
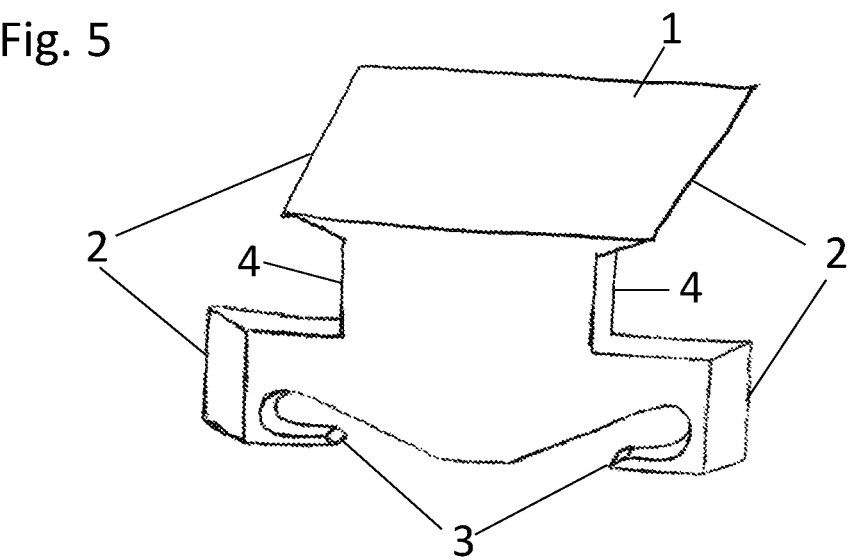
FIG. 5 is a pictorial view of a potential tool for this method focusing on the hooking/grabbing feature and cutting edges.

The tool (6) that is utilized within this method preferably incorporates a cutting edge (2) on multiple surfaces. FIG. 5 shows these different cutting edges (2) and their desired locations. Having these cutting edges (2) on just one side of the tool (6) could work, but when they are on both sides of the tool (6) it allows easier cutting from any position around the trailer. The cutting edges (2) of the tool (6) within this method ideally come to a point to further increase the ease of cutting weeds or the like. FIG. 4 shows a close-up view of how the cutting edge (2) is intended to work. Its function is to cut weeds that are hanging over trailer beams, so they fall to the ground. The user would position the cutting edge on a weed with the trailer behind it and push/pull creating enough force to cut the weed in half. The weed then falls off the trailer onto the ground. Within this method the cutting edge (2) is also used to scrape algae off of trailer bunks and beams.

Figure 6:
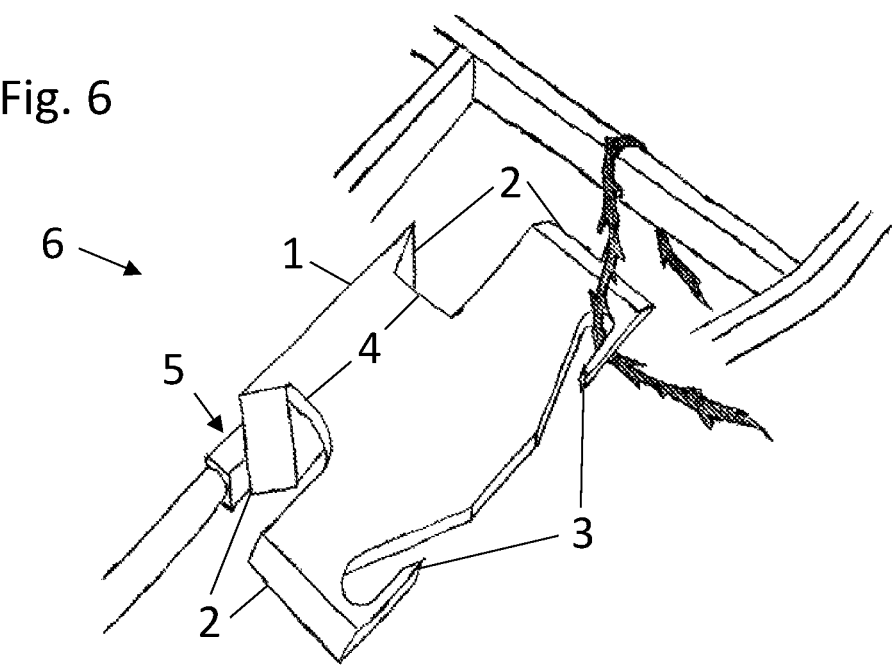
FIG. 6 is a close-up view of a potential tool for this method hooking/grabbing a weed to remove it from the trailer beam.

The method for this invention incorporates a tool (6) that preferably includes a hooking/grabbing feature (3), which is shown in FIG. 5. Both sides of the tool (6) have the hooking/grabbing feature (3). Having this feature on just one side of the tool (6) could work, but preferably it is on both sides so it can be easily used from any position around the trailer. The function of this feature is to hook/grab weeds that are hanging on the trailer and then push/pull so the weed is removed from the trailer. FIG. 6 is a close-up view of how this hooking feature (3) is intended to work when the user performs the weed removal method incorporating the tool (6). The user can reach with the handle and hook/grab the weed and then push/pull the tool (6) to remove the desired weed from the trailer. With the preferred hook/grab design of the tool (6) the method of removing weeds can be accomplished at any angle from the outside of the trailer.

Figure 7:
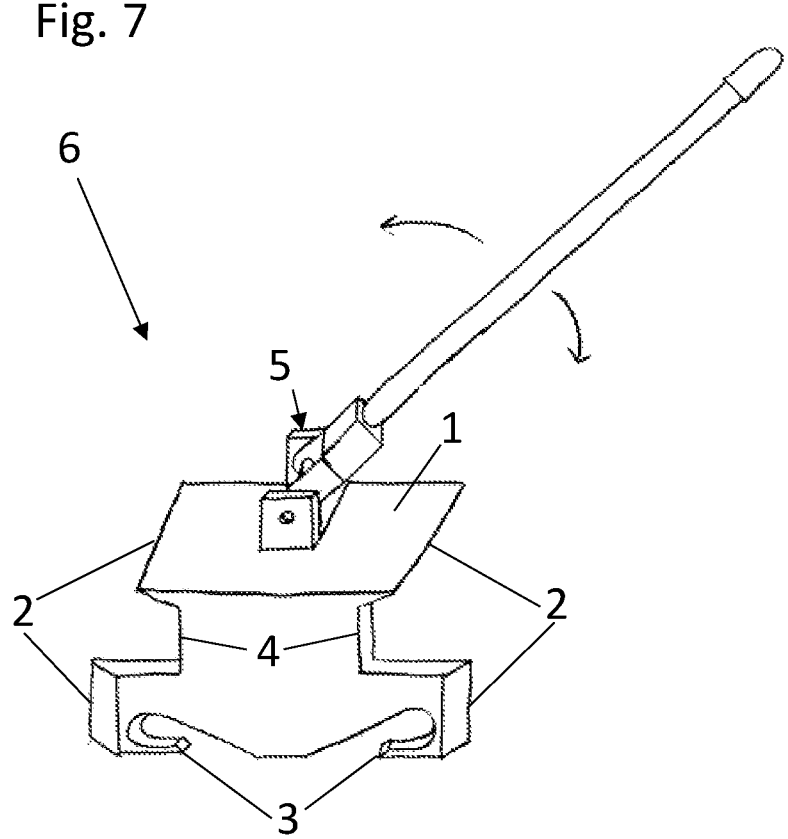
FIG. 7 is a pictorial view of a potential tool for this method focusing on how the handle is designed to rotate around the head of the invention.

FIG. 7 shows the that the tool (6) utilized within the weed or like removal method preferably has a moveable head (5) with an extended handle. The handle could be fixed to the head of the tool (6) without rotation, but the movable rotation of the head allows it to conform to the trailer beams at many different angles making it easier for the user to use. The handle length is ideally designed to reach inside most standard size trailer widths; however, should be removable so the handle length can be modified as needed to provide options for larger boats, pontoons, and personal watercraft trailers. The preferred design to accomplish this could be a screw handle incorporated in the head of the tool (6) so it is easy to change. A telescoping handle design could also be used to vary handle length.

When performing the method to remove weeds from trailers the tool (6) that is utilized preferably is made from water-resistant material to ensure that it withstands the elements it is exposed to. The tool (6) would also need to be durable to withstand repeat use. A hard-plastic material could be used and manufactured using injection molding or additive manufacturing methods common in industry. The handle is ideally light weight and rigid to improve ease of use and ergonomics. Common store purchased handles would be adequate when using this tool (6) as part of the method to remove weeds and like from trailers.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The claim of this invention is:

1. A method to remove weeds, milfoil, invasive species from watercraft trailers while out of the water utilizing a tool in the form of right angles with a head and side edge's with capture and collecting means, scrapes in the form of sharpened edge on perimeter edges, sharp edges to cut weeds pinched between boat and trailer, hooks at the leading and trailing edges, the tool also including a handle, with the angles and size of the tool allowing the tool to be moved along a rail to remove weeds, milfoil, invasive species from watercraft trailers and tight beam intersections while out of the water.

* * * * *